United States Patent
Komatsu

(10) Patent No.: US 10,062,027 B2
(45) Date of Patent: Aug. 28, 2018

(54) GOLF BALL INCORPORATING IC CHIP AND METHOD OF MANUFACTURING THE SAME

(71) Applicant: BRIDGESTONE SPORTS CO., LTD., Tokyo (JP)

(72) Inventor: Atsushi Komatsu, Saitama (JP)

(73) Assignee: BRIDGESTONE SPORTS CO., LTD., Minato-Ku, Tokyo (JP)

( * ) Notice: Subject to any disclaimer, the term of this patent is extended or adjusted under 35 U.S.C. 154(b) by 54 days.

(21) Appl. No.: 14/750,677

(22) Filed: Jun. 25, 2015

(65) Prior Publication Data

US 2015/0379388 A1    Dec. 31, 2015

(30) Foreign Application Priority Data

Jun. 26, 2014 (JP) .................................. 2014-131572

(51) Int. Cl.
  *A63B 37/06* (2006.01)
  *G06K 19/077* (2006.01)
  *A63B 37/00* (2006.01)
  *G06K 19/04* (2006.01)

(52) U.S. Cl.
  CPC .... *G06K 19/07728* (2013.01); *A63B 37/0043* (2013.01); *A63B 37/0062* (2013.01); *A63B 37/0064* (2013.01); *A63B 37/0075* (2013.01); *A63B 37/0092* (2013.01); *G06K 19/041* (2013.01); *G06K 19/07783* (2013.01)

(58) Field of Classification Search
  CPC ..................................................... A63B 43/00
  USPC ........................................................ 473/353
  See application file for complete search history.

(56) References Cited

U.S. PATENT DOCUMENTS

| | | | | |
|---|---|---|---|---|
| 6,605,009 B1 * | 8/2003 | Nakamura | ......... | A63B 37/0003 473/374 |
| 8,500,574 B2 * | 8/2013 | Sullivan | ............. | A63B 37/0003 473/373 |
| 2002/0065567 A1 * | 5/2002 | Kodera | .............. | A63B 69/3694 700/92 |
| 2005/0164808 A1 * | 7/2005 | Sasaki | ................ | A63B 37/0003 473/351 |
| 2009/0124416 A1 * | 5/2009 | Sullivan | ............. | A63B 37/0003 473/373 |

(Continued)

FOREIGN PATENT DOCUMENTS

| | | |
|---|---|---|
| JP | 07-192158 A | 7/1995 |
| JP | 2000-229133 A | 8/2000 |

(Continued)

OTHER PUBLICATIONS

English Abstract and Machine Translation for JP4373892, Publication Date: Nov. 25, 2009.

*Primary Examiner* — Raeann Gorden

(74) *Attorney, Agent, or Firm* — IP Business Solutions, LLC

(57) ABSTRACT

A golf ball includes an RFID tag provided with an IC chip and an antenna. A protective layer surrounds the outer periphery of the RFID tag. A core surrounds the outer periphery of the protective layer. A cover surrounds the outer periphery of the core. The protective layer is formed by a material having a hardness equal to or more than 30 in Shore D. Further, the diameter of the protective layer is 3 to 30 millimeters, and the outer shape of the protective layer has an approximately spherical shape.

11 Claims, 2 Drawing Sheets

(56) References Cited

U.S. PATENT DOCUMENTS

2013/0196787 A1* 8/2013 Luciano, Jr. ....... A63B 37/0076
473/371
2015/0094167 A1* 4/2015 Zimmerman ........... G01S 19/19
473/353

FOREIGN PATENT DOCUMENTS

JP 2003-503167 A 1/2003
JP 2005-205091 A 8/2005

* cited by examiner

GOLF BALL INCORPORATING IC CHIP AND METHOD OF MANUFACTURING THE SAME

BACKGROUND OF THE INVENTION

Field of the Invention

The present disclosure relates to a golf ball incorporating an IC chip such as a radio-frequency identification (RFID) tag and a method of manufacturing the same.

Description of the Related Art

The following description of related art sets forth the inventors' knowledge of the related art and certain problems therein and should not be construed as an admission of knowledge in the prior art.

Attempts have been made to incorporate an integrated circuit (IC) chip in a golf ball in order to record information related to the golf ball, such as material, manufacturing location, production date, and the like.

For example, Japanese Patent Application Laid-Open Publication No. 2005-205091 discloses a golf ball in which an IC chip surrounded by a protective layer is arranged in a center position of the golf ball. This protective layer is formed by a special rubber member such as silicone rubber, butyl rubber, and the like. A solid core made of the conventional rubber composition is formed in the periphery of the protective layer, and a cover made of the conventional resin composition is coated in the periphery of the solid core.

A golf ball incorporating an IC chip has not been realized because the golf ball is instantaneously and greatly deformed when the ball is struck by a golf club. Therefore, the incorporated IC chip is broken so that the communication becomes impossible. In the meantime, there is a problem of using the golf ball in normal golfing actions when the configuration of the golf ball is changed to prevent the breakage of the IC chip. For example, the resilience and the durability of the golf ball are lowered.

In view of the aforementioned problems, an object of the present invention is to provide a golf ball incorporating an IC chip that can prevent the IC chip from breaking when the golf ball is struck and can maintain the resilience and the durability of the golf ball.

The description herein of advantages and disadvantages of various features, embodiments, methods, and apparatus disclosed in other publications is in no way intended to limit the present invention. For example, certain features of the described embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The disclosed embodiments of the present invention have been developed in view of the above-mentioned and/or other problems in the related art. The disclosed embodiments of the present invention can improve upon existing methods and/or apparatuses.

To attain the aforementioned objects, a golf ball incorporating an IC chip according to the present invention includes an IC chip. The golf ball also includes a protective layer surrounding the outer periphery of the IC chip. The golf ball also includes a core surrounding the outer periphery of the protective layer. The golf ball also includes a cover surrounding the outer periphery of the core. The protective layer is formed by a material having hardness equal to or more than 30 in Shore D. The diameter of the protective layer has 3 to 30 millimeters, and the outer shape of the protective layer has an approximately spherical shape.

The IC chip may configure a radio-frequency identification (RFID) tag with an antenna connected to the IC chip. In this case, the protective layer surrounds the outer periphery of the RFID tag.

The hardness of the core may be less than the hardness of the protective layer. Further, a material of the protective layer may include a resin, and a material of the core may include a rubber. Furthermore, a difference between the hardness of the core and the hardness of the protective layer is preferably equal to or less than 20.

In one embodiment of the present invention, the protective layer surrounding the outer periphery of the IC chip is formed by the material having hardness equal to or more than 30 in Shore D. Therefore, the protective layer can prevent the golf ball from deforming when the golf ball is struck. Further, the diameter of the protective layer is equal to or more than 3 millimeters. Thus, the IC chip inside the protective layer can be sufficiently protected. Furthermore, the diameter of the protective layer having such a high hardness is equal to or less than 30 millimeters. The area for forming the core positioned outside the protective layer can be sufficiently secured. Therefore, high resilience and high durability of the golf ball can be maintained.

Further, the golf ball includes an antenna electronically connected to the IC chip, wherein the antenna encircles the IC chip. The antenna and the IC chip include an RFID tag.

A golf ball configured to transmit or receive information by a wireless communication includes a radio-frequency identification (RFID) tag having an integrated circuit (IC) chip and an antenna. The golf ball also includes a protective layer surrounding the RFID tag and formed by a material having a hardness equal to or more than 30 in Shore D. The golf ball also includes a core surrounding the protective layer. The core has a hardness less than the hardness of the protective layer and a cover enclosing the core. The diameter of the protective layer is greater than a diameter of the antenna.

Further, the diameter of the protective layer is between 3 to 30 millimeters. Furthermore, the hardness of the core is equal to or less than 60 in Shore D. Still, the material of the protective layer has a melting point equal to or less than 230 degrees Celsius. Still furthermore, the material of the protective layer has a melting point equal to or greater than 80 degrees Celsius.

Further, the material of the protective layer includes a resin or a rubber, or a mixture thereof. Furthermore, the material of the protective layer further includes an organic peroxide. Still, a difference between the hardness of the protective layer and the hardness of the core is about 20 is Shore D.

In the present invention, a method for manufacturing a golf ball incorporating a radio-frequency identification (RFID) tag, the method includes the steps of: placing the RFID tag inside a mold for a protective layer having a spherical shape; injecting a material having a predetermined hardness inside the mold to surround the RFID tag; forming a core around the protective layer, wherein a material for the core has a hardness less than the predetermined hardness of the protective layer; and covering the core with a cover.

Further, the forming step includes using a half-cup molding process. Furthermore, the method includes a step of forming an outer periphery surface of the protective layer with unevenness. Still, the injecting step includes using the material having hardness equal to or more than 30 in Shore D. Still furthermore, the injecting step includes forming the protective layer having a diameter of 3 to 30 millimeters.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

In the drawings, the size and relative sizes of layers and regions may be exaggerated for clarity. Like numbers refer to like elements throughout. The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/". It will be understood that, although the terms first, second, etc. may be used herein to describe various elements, these elements should not be limited by these terms. Unless indicated otherwise, these terms are only used to distinguish one element from another. For example, a first object could be termed a second object, and, similarly, a second object could be termed a first object without departing from the teachings of the disclosure. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). However, the term "contact," as used herein refers to direct contact (i.e., touching) unless the context indicates otherwise. Terms such as "same," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes. The term "substantially" may be used herein to reflect this meaning. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

BRIEF DESCRIPTION OF THE DRAWINGS

The disclosed embodiments of the present invention are shown by way of example, and not limitation, in the accompanying figures.

DETAILED DESCRIPTION EMBODIMENTS

In the following paragraphs, some embodiments of the invention will be described by way of example and not limitation. It should be understood based on this disclosure that various other modifications can be made by those in the art based on these illustrated embodiments.

Hereinafter, one embodiment of a golf ball incorporating an IC chip according to the present invention will be described with reference to the drawings. This embodiment is utilized to facilitate understanding of the present invention, and therefore the present invention is not intended to be limited. The drawings are not shown to scale in order to make the present invention easier to understand.

Figure 1:
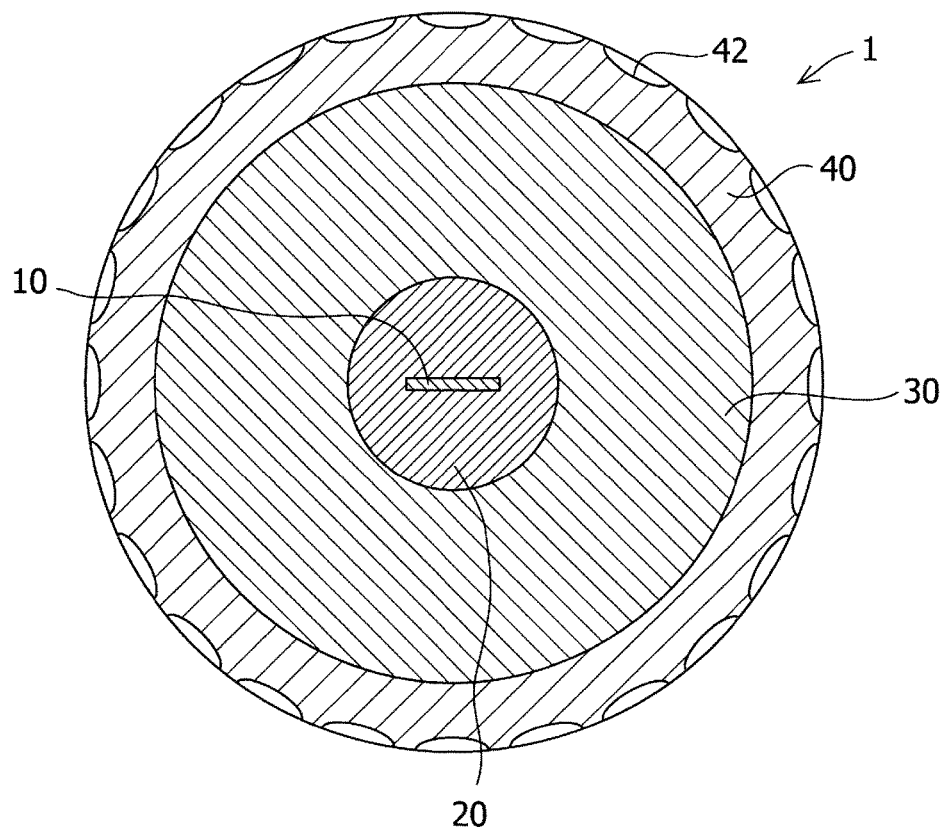
FIG. 1 is a cross-sectional view schematically showing one embodiment of a golf ball according to the present invention.

As shown in FIG. 1, a golf ball 1 of the present embodiment is provided with an RFID tag 10 for transmitting and receiving information by a wireless communication. A protective layer 20 is positioned in a center of the ball and surrounds the RFID tag 10. A core 30 surrounds the outside of the protective layer. A cover 40 surrounds the outside of the core. A plurality of dimples 42 are formed on the surface of the cover 40.

Figure 2:
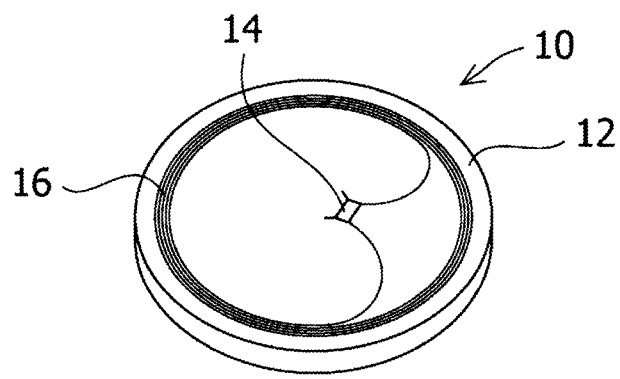
FIG. 2 is a perspective view schematically showing the golf ball shown in FIG. 1 incorporating a RFID tag.

As shown in FIG. 2, the RFID tag 10 is provided with an IC chip 14 for storing and computing information, and an antenna 16 for communicating with a radio-frequency signal. The IC chip 14 and the antenna 16 are electrically connected. The RFID tag 10 is preferably a passive-type tag which operates by receiving a radio wave as an energy source from an external reader, but it may be an active-type tag which incorporates a battery. In this case, the internal battery can be charged by a non-contact charger. In the present embodiment, the RFID tag 10 is formed on a substrate 12 made of the same material as the protective layer 20 which will be described later or the RFID tag 10 is formed inside the substrate. However, it is not limited to these structures as long as the RFID system is provided with the IC chip 14 and the antenna 16 and the RFID tag 10 is sufficiently surrounded by the material forming the protective layer 20.

The outer shape of the protective layer 20 is an approximately spherical shape to become concentric to the golf ball. The RFID tag 10 is arranged inside the protective layer 20. The material forming the protective layer 20 requires hardness equal to or more than 30 in Shore D. By forming the protective layer 20 made of such material having high hardness, the deformation of the protective layer 20 surrounding the RFID tag 10 is suppressed when the golf ball 1 is struck by a golf club. Thus, the damage to the RFID tag 10 and the IC chip 14, or the antenna 16 which is the part of the RFID tag, can be prevented. The hardness of the material of the protective layer 20 is preferably equal to or more than 50 in Shore D, and more preferably equal to or more than 60. The upper limit of the hardness of the protective layer 20 is not particularly limited, but it is preferably equal to or less than 100.

A resin or a rubber can be used as long as the materials have such hardness. As a resin, a thermoplastic elastomer, a thermo-plastic, etc., or a mixture of these materials can be used, but it is not limited to these materials.

As a thermoplastic elastomer, a polyester-based thermoplastic elastomer, a styrene-based thermoplastic elastomer, a polyurethane-based thermoplastic elastomer, and the like can be used, but the thermoplastic elastomer is not limited to these materials. Further, as a thermo-plastic, a polycarbonate, a polyethylene resin, an ionomer resin, and the like can be used, but the thermos-plastic is not limited to these materials.

As an ionomer resin, the materials including the following (a) component and/or (b) component as a base resin can be used, but it is not limited to these materials. Further, the following (c) component can be arbitrarily added in the base resin. The (a) component is olefin-unsaturated carboxylic acid-unsaturated carboxylic acid ester random terpolymer and/or metal salt thereof. The (b) component is olefin-unsaturated carboxylic acid random copolymer and/or metal salt thereof. The (c) component is thermoplastic block copolymer having polyolefin crystal block and polyethylene random copolymer, or butylene random copolymer.

As a rubber, for example, a styrene butadiene rubber, a polybutadiene rubber, a natural rubber, and the like can be used. Further, in addition to the aforementioned resins or rubbers as a main component, organic peroxide, and the like can be added in the protective layer 20.

When the melting point to manufacture the golf ball 1 is too high, the RFID tag 10 and the IC chip 14, or the antenna 16 which is the part of the RFID tag, may be damaged when forming the protective layer 20 by injection. Therefore, the melting point of the material forming the protective layer 20 is preferably equal to or less than 230° C., and more preferably equal to or less than 210° C. On the other hand, when the melting point of the material forming the protective layer 20 is too low and when the core 30 is vulcanized and formed, the protective layer 20 positioned inside the core may be melted and broken. Therefore, the melting point is preferably equal to or more than 80° C., and more preferably equal to or more than 150° C.

A diameter of the protective layer 20 is in a range between 3 to 30 millimeters. The diameter of the protective layer 20 is required to be greater than the diameter of the antenna 16 in order to protect the RFID tag 10 by the protective layer 20, and it is preferably in a range of 1 to 3 millimeters greater than the diameter of the antenna 16. When the diameter of the protective layer 20 is less than 3 millimeters, the dimension of the protective layer is too small so that the IC chip 14 cannot be sufficiently protected from the damage. Further, by widening the size of the antenna 16, the reading capability of the RFID tag 10 can be improved, and therefore it is preferable that the diameter of the protective layer 20 be larger. There are problems that when the diameter of the protective layer 20 is too large as this adversely affects the resilience and the durability of the golf ball because the protective layer 20 is formed by the material having high hardness. Therefore, by forming the protective layer 20 in a diameter of equal to or less than 30 millimeters, the region of the core 30 positioned outside the protective layer 20 can be secured, and the resilience and the durability of the golf ball can be maintained. The lower limit of the diameter of the protective layer 20 is preferably equal to or more than 4 millimeters, and more preferably equal to or more than 5 millimeters. Further, the upper limit of the diameter of the protective layer 20 is preferably equal to or less than 25 millimeters, and more preferably equal to or less than 20 millimeters.

The core 30 can be mainly formed by rubber. For the base material, a synthetic rubber and a natural rubber can be widely used, but it is not limited to these materials. A polybutadiene rubber (BR), a styrene butadiene rubber (SBR), a natural rubber (NR), a polyisoprene rubber (IR), a polyurethane rubber (PU), a butyl rubber (IIR), a vinyl polybutadiene rubber (VBR), an ethylene propylene rubber (EPDM), a nitrile rubber (NBR), and a silicone rubber can be used. As the polybutadiene rubber (BR), for example, 1,2-polybutadiene, cis-1,4-polybutadiene, and the like can be used.

In addition to such base material rubbers, for example, a crosslinking material, a crosslinking initiator, a filler, an antioxidant, an isomerization agent, a peptizer, a sulfur, and an organic sulfur compound can be added in the core 30. Further, as the main component, a resin may be used instead of the rubber. For example, a thermoplastic elastomer, an ionomer resin, or a mixture of these materials can be used.

As a crosslinking material, for example, α, β-unsaturated carboxylic acid or metal salt thereof is preferably used, but it is not limited to these materials. For example, α, β-unsaturated carboxylic acid or metal salt thereof includes acrylic acid, methacrylic acid, and zinc salt, magnesium salt, calcium salt of these materials, and the like. For example, a mixing rate of the crosslinking material is preferably approximately equal to or more than 5 parts by weight and more preferably approximately equal to or more than 10 parts by weight when the base material rubber is 100 parts by weight, but it is not limited to this. Further, the mixing rate of the crosslinking material is preferably approximately equal to or less than 70 parts by weight and more preferably approximately equal to or less than 50 parts by weight.

As a crosslinking initiator, organic peroxide is preferably used, but it is not limited to this material. Examples of the crosslinking initiator includes dicumyl peroxide, t-butyl-peroxy benzoate, di-t-butyl peroxide, 1,1-bis(t-butyl peroxide)3, 3, 5-trimethyl cyclohexane, and the like. For example, a mixing rate of the crosslinking initiator preferably is approximately equal to or more than 0.10 parts by weight, and more preferably, approximately equal to or more than 0.15 parts by weight, and further more preferably, approximately equal to more than 0.30 parts by weight when the base material rubber is 100 parts by weight, but it is not limited to this. Further, the mixing rate of the crosslinking initiator preferably is approximately equal to or less than 8 parts by weight, and more preferably, approximately equal to or less than 6 parts by weight.

As a filler, for example, silver, gold, cobalt, chromium copper, iron, germanium, manganese, molybdenum, nickel, lead, platinum, tin, titanium, tungsten, zinc, zirconium, barium sulfate, zinc oxide, manganese oxide, and the like can be used, but it is not limited to these materials. The filler is preferably in a powdered form. For example, a mixing rate of the filler preferably is approximately equal to or more than 1 parts by weight, and, more preferably, approximately equal to or more than 2 parts by weight, and, further more preferably, approximately equal to or more than 3 parts by weight when the base material rubber is 100 parts by weight, but it is not limited to this. Further, the mixing rate of the filler preferably is approximately equal to or less than 100 parts by weight, and, more preferably, approximately equal to or less than 80 parts by weight, and, further more preferably, approximately equal to or less than 70 parts by weight.

As an antioxidant, for example, commercial products such as Nocrac NS-6™ and the like can be used, but it is not limited this material. A mixing rate of the antioxidant preferably is approximately equal to or more than 0.1 parts by weight, and, more preferably, approximately equal to or more than 0.15 parts by weight when the base material rubber is 100 parts by weight, but it is not limited to this. Further, the mixing rate of the antioxidant preferably is approximately equal to or less than 1.0 parts by weight, and, more preferably, approximately equal to or less than 0.7 parts by weight.

The resilience of the core 30 can be improved by adding an organic sulfur compound (peptizing agent). The organic sulfur compound is selected from thiophenols, thiocarboxylic acids, and the metal salts thereof. As thiophenols and thiocarboxylic acids, thiophenols such as pentachlorothiophenol, 4-t-butyl-o-thiophenol, 4-t-butyl thiophenol, 2-benzamide thiophenol, and the like, and thiocarboxylic acids such as thiobenzoic acid, and the like, are included. Further, as the metal salts thereof, zinc salt and the like is preferable. A mixing rate of the organic sulfur compound preferably is approximately equal to or more than 0.5 parts by weight, and, more preferably, approximately equal to or more than 1 parts by weight when the base material rubber is 100 parts by weight, but it is not limited to this. Further, the mixing rate of the organic sulfur compound preferably is approximately equal to or less than 3 parts by weight, and, more preferably, equal to or less than 2 parts by weight.

It is preferable that the hardness of the core 30 be softer, or less, than the hardness of the material forming the protective layer 20. The hardness in the present disclosure means an average value of hardness of an outer surface of the core and hardness of a layer being in contact with the protective layer. The protective layer 20 is formed by the material having a high hardness. By forming the core 30 with the soft material, it prevents the entire golf ball from excessively having high hardness. The upper limit of the hardness of the core 30 is preferably equal to or less than 60 in shore D, and, more preferably, equal to or less than 50, and, further more preferably, equal to or less than 40. On the other hand, the lower limit of the hardness of the core 30 is preferably equal to or more than 20 in shore D, and, more preferably, equal to or more than 30, but it is not limited to this. The hardness of the core 30 may be harder than the material forming the protective layer 20.

When the difference of the hardness between the protective layer 20 and the core 30 is too large, this condition causes peeling between the protective layer 20 and the core 30 and may affect the durability of the golf ball. Thus, the difference $H_D$ of the hardness between the protective layer 20 and the core 30 is preferably approximately equal to or less than 20, and more preferably approximately equal to or less than 10, but it is not limited to this.

It is preferable that the core 30 uniformly surrounds the outer periphery of the protective layer 20. In order to apply a predetermined repulsive force to the golf ball, the lower limit of the thickness of the core 30 is preferably equal to or more than 4.5 millimeters, and, more preferably, equal to or more than 10 millimeters. On the other hand, the upper limit of the thickness of the core 30 is not particularly limited, but it is preferably equal to or less than 20 millimeters, and, more preferably, equal to or less than 15 millimeters. Further, the core 30 is shown as one layer in FIG. 1, but it is not limited to this. For example, the core may be formed from a plurality of layers.

An ionomer resin, a polyurethane-based thermoplastic elastomer, a thermoset polyurethane, or a mixture of these materials can be used to form the cover 40, but it is not limited to these materials. Further, in addition to the aforementioned main components, another thermoplastic elastomer, or a polyisocyanate compound, fatty acid or derivative thereof, a basic inorganic metal compound, filler, etc. can be added in the cover 40.

The hardness of the material forming the cover 40 is preferably equal to or more than 50 in Shore D, and, more preferably, equal to or more than 55, but it is not limited to this. Further, the hardness of the material forming the cover 40 is preferably equal to or less than 75, and, more preferably, equal to or less than 70, and, further more preferably, equal to or less than 65.

The lower limit of the thickness of the cover 40 is preferably equal to or more than 0.2 millimeters, and, more preferably, equal to or more than 0.4 millimeters, but it is not limited to this. Further, the upper limit of the thickness of the cover 40 is preferably equal to or less than 4 millimeters, and, more preferably, equal to or less than 3 millimeters, and, further more preferably, equal to or less than 2 millimeters. A plurality of dimples 42 are formed on the surface of the cover 40. A size, a shape, a number, etc. of the dimples 42 can be arbitrarily designed in response to the desired aerodynamic characteristic of the golf ball 1.

An intermediate layer (omitted in the drawings) may be arbitrarily provided between the core 30 and the cover 40. The intermediate layer having a core-like function may be provided, and the intermediate layer having a cover-like function may be provided. Further, a plurality of intermediate layers may be provided. For example, a plurality of intermediate layers having the core-like or cover-like function may be provided. Alternatively, the first intermediate layer having the core-like function and the second intermediate layer having the cover-like function may be provided.

As a material of the intermediate layer, the following heated mixtures are preferably used as a main material, but it is not limited to these materials. By using these materials for the intermediate layer, a low spin can be realized when the ball is struck so as to greatly improve carry.

A base resin may have a mixing ratio of (a) olefin-unsaturated carboxylic acid random copolymer and/or a metal ion neutralized product of olefin-unsaturated carboxylic acid random copolymer, and (b) olefin-unsaturated carboxylic acid-unsaturated carboxylic acid ester random terpolymer and/or a metal ion neutralized product of olefin-unsaturated carboxylic acid-unsaturated carboxylic acid ester random terpolymer of 100:0 to 0:100 in ratio by weight; (e) non-ionomer thermoplastic elastomer which is mixed to become a mixing ratio of 100:0 to 50:50 in ratio by weight with respect to the base resin; (c) 5 to 150 parts by weight of fatty acid having molecular weight from 228 to 1500 and/or derivative thereof with respect to 100 parts by weight of resin components including the base resin and the (e) component; and 0.1 to 17 parts by weight of a basic inorganic metal compound which can neutralize acid radicals which are not neutralized in the (d) base resin and the (c) component.

The phrase "main material" means a material which is preferably equal to or more than 50% by weight, and, more preferably, equal to or more than 60% by weight, and, further more preferably, equal to or more than 70% by weight with respect to the total weight of the intermediate layer.

The hardness of the material forming the intermediate layer is preferably equal to or more than 40 in Shore D, and, more preferably, equal to or more than 45, and, further more preferably, equal to or more than 50. It is preferable that the hardness of the material forming the intermediate layer be softer than the hardness of the cover 40, and specifically, it is preferably equal to or less than 65 in Shore D, and more preferably equal to or less than 60.

The thickness of the intermediate layer is preferably equal to or more than 0.5 millimeters, and more preferably equal to or more than 1 millimeters, but it is not limited to this. Further, the thickness of the intermediate layer is preferably equal to or less than 10 millimeters, and more preferably equal to or less than 5 millimeters, and further more preferably equal to or less than 3 millimeters.

Next, an example of a method for manufacturing the golf ball 1 incorporating the RFID tag 10 having the aforementioned configuration will be described. The protective layer 20 can be formed by, for example, an injection molding method, and the like. Specifically, the RFID tag 10 is initially placed inside a mold for the protective layer 20 having a predetermined spherical shape. A material having a predetermined hardness is injected and introduced to the inside of the mold. The protective layer 20 in which the RFID tag 10 is sufficiently surrounded by the material having the predetermined hardness can be formed. In order to improve adhesiveness with the core 30, the processing may be applied to form the outer periphery surface of the protective layer 20 with unevenness. However, the method for forming the protective layer 20 is not limited to the injection molding; the protective layer 20 can be formed by using two-component type resin.

It is not particularly limited but the core 30 can be formed by, for example, a half-cup molding method. Specifically, after the material including the base material rubber is kneaded by a kneading machine, a pair of half cups is initially formed by using the kneaded material. The protective layer 20 is wrapped by the half cups and it is heated and vulcanized so that the half cups are bonded to each other. Using this process, the core 30 surrounding the outer periphery of the protective layer 20 can be formed.

The cover 40 can be formed by, for example, an injection molding method. Specifically, the core 30 formed by the aforementioned method is placed in the center inside the mold for cover. The cover material is injected and introduced to the inside of the mold to cover the core 30. Therefore the cover 40 can be formed. Further, the golf ball 1 incorporating the RFID tag 10 can be manufactured. When the antenna 16 of the RFID tag 10 has directivity, in the surface of the cover 40, a mark may be given to indicate a position to easily perform reading by the reader. For example, when a plurality of rings are formed as shown in FIG. 2, a mark can be given in a position of the ball surface in a perpendicular direction to the surface of the plurality of rings.

The shape of the RFID tag 10 has a discoid shape shown in FIG. 2 but may be any shape as long as the IC chip 14 and the antenna 16 are appropriately supported or secured. For example, it may be a quadrangle shape such as a square, a rectangle, and the like, or it may be other shapes. Further, the thickness of the RFID tag 10 is not particularly limited as long as it has a sufficient thickness to support and store the IC chip 14 and the antenna 16. The IC chip 14 and the antenna 16 are not supported or secured in the substrate 12 and may be directly incorporated inside the protective layer 20, if appropriate.

The shape of the antenna 16 is not particularly limited as long as it is an appropriate shape. It has a shape in which a plurality of rings are overlapped on the plain surface as shown in FIG. 2 but may be a shape in which a plurality of rings are stereoscopically intersected, etc. in order to maintain symmetry of the golf ball. In addition, in order to maintain symmetry of the golf ball, a dummy antenna, which is not electrically connected to the IC chip 14, may be arranged.

Further, the antenna 16 is not limited to connecting with the IC chip 14 as shown in FIG. 2. For example, the antenna 16 communicating with the external reader by a radio wave may be arranged in the core surface, the intermediate layer surface, and the like, of the golf ball 1. A boost antenna further communicating with the antenna 16 by a radio wave may be arranged to connect with the IC chip 14 inside the RFID tag 10. Further, the RFID tag 10 may not be included inside the protective layer 20. Thus, only IC chip 14 may be included. The IC chip 14 is not limited to reading information from the outside of the ball 1 without breakage, but also the predetermined information can be read by breaking the ball 1.

EXAMPLES

Each of the golf balls having configurations shown in Table 1 is produced, and the resilience, the durability of the golf balls and the readability of the incorporated RFID tag are measured. Table 2 shows the contents of the configuration of the protective layer shown in Table 1. Table 3 shows the mixing rate of the materials of the core (parts by weight). Table 4 shows the mixing rate of the materials of the cover and the intermediate layer (parts by weight).

TABLE 1

|  |  | Examples | | | | | | Comparison Examples | | | | |
| --- | --- | --- | --- | --- | --- | --- | --- | --- | --- | --- | --- | --- |
|  |  | 1 | 2 | 3 | 4 | 5 | 6 | 7 | 8 | 9 | 10 | 11 |
| Protective layer | Component | A | B | C | D | E | F | G | H | I | J | K |
|  | Hardness | 36 | 45 | 60 | 65 | 55 | 52 | 28 | 26 | 32 | 33 | 35 |
|  | Difference $H_D$ | −14 | −5 | 10 | 10 | 0 | −3 | −22 | −24 | −18 | −22 | −20 |
| Core | Outer diameter | 37.7 | 37.7 | 37.7 | 37.7 | 39.3 | 39.3 | 37.7 | 37.7 | 37.7 | 39.3 | 39.3 |
|  | Mixing rate | a | a | b | e | c | d | a | a | a | d | c |
|  | Hardness | 50 | 50 | 50 | 55 | 55 | 55 | 50 | 50 | 50 | 55 | 55 |
| Cover | Thickness | 0.8 | 0.8 | 0.8 | 0.8 | 1.7 | 1.7 | 0.8 | 0.8 | 0.8 | 1.7 | 1.7 |
|  | Hardness | 48 | 48 | 48 | 48 | 48 | 48 | 48 | 48 | 48 | 48 | 48 |
|  | Mixing rate | g | g | g | g | g | g | g | g | g | g | g |

TABLE 1-continued

|  |  | Examples | | | | | | Comparison Examples | | | | |
| --- | --- | --- | --- | --- | --- | --- | --- | --- | --- | --- | --- | --- |
|  |  | 1 | 2 | 3 | 4 | 5 | 6 | 7 | 8 | 9 | 10 | 11 |
| Intermidate layer | Thickness | 1.7 | 1.7 | 1.7 | 1.7 | — | — | 1.7 | 1.7 | 1.7 | — | — |
|  | Hardness | 62 | 62 | 62 | 62 | — | — | 62 | 62 | 62 | — | — |
|  | Mixing rate | h | h | h | h | — | — | h | h | h | — | — |
| Resilience |  | ⊙ | ⊙ | ○ | ○ | ○ | ○ | ○ | ○ | ⊙ | X | X |
| Durability |  | ○ | ○ | ⊙ | ⊙ | ○ | ○ | X | X | ○ | ○ | ○ |
| Readability |  | ○ | ○ | ⊙ | ○ | ⊙ | ⊙ | ○ | ○ | X | ⊙ | ⊙ |

TABLE 2

| Component | Tag diameter [mm] | Protective layer diameter [mm] | Material of protective layer | Melting point [° C.] | Hardness of protective layer [Shore D] |
| --- | --- | --- | --- | --- | --- |
| A | 2 | 3 | HYTREL | 180 | 36 |
| B | 6.5 | 8 | Ionomer A | 90 | 45 |
| C | 13 | 14.5 | Polycarbonate A | 200 | 60 |
| D | 6.5 | 8 | Polycarbonate B | 200 | 65 |
| E | 25 | 26.5 | Ionomer B | 90 | 55 |
| F | 28 | 30 | Rubber A | — | 52 |
| G | 12 | 14 | Rubber B | — | 28 |
| H | 15 | 17 | Urethane | 180 | 26 |
| I | 1 | 2.5 | HYTREL | 160 | 32 |
| J | 29 | 31.5 | HYTREL | 160 | 33 |
| K | 32 | 33.5 | HYTREL | 160 | 35 |

The RFID tag is a commercial versatile passive RFID.
HYTREL ™ is a polyester-based thermoplastic elastomer made of E. I. Dupont de Nemours and Co., Inc.
Ionomer A is a mixture of HIMILAN 1557 ™ and HIMILAN 1855 ™ made of DuPont-Mitsui Polychemicals Co., Ltd.
Ionomer B is a mixture of HIMILAN 1605 ™ and HIMILAN 1706 ™ made of DuPont-Mitsui Polychemicals Co., Ltd.
Polycarbonate A is polycarbonate of TARFLON A1900 ™ made of Idemitsu Kosan Co.
Polycarbonate B is polycarbonate of TARFLON A1700 ™ made of Idemitsu Kosan Co.
Rubber A is BR730 ™ made of JSR Corporation.
Rubber B is BR01 ™ made of JSR Corporation.

TABLE 3

|  |  | a | B | c | d | e |
| --- | --- | --- | --- | --- | --- | --- |
| Polybutadiene |  | 100 | 100 | 100 | 100 | 100 |
| Organic peroxide | PERHEXA C | 0.3 | 0.3 | 0.3 | 0.3 | 0.3 |
|  | Percumyl | 0.3 | 0.3 | 0.3 | 0.3 | 0.3 |
| Zinc oxide |  | 20.5 | 22.4 | 32.5 | 27.0 | 18.0 |
| Antioxidant |  | 0.1 | 0.1 | 0.1 | 0.1 | 0.1 |
| Zinc acrylate |  | 29.0 | 29.0 | 35.0 | 35.0 | 35.0 |
| Pentachlorothiophenol zinc salt |  | 1.0 | 1.0 | 1.0 | 1.0 | 1.0 |

Polybutadiene is BR730 made of JSR Corporation, and is used as a base material rubber.
PERHEXA C is a mixture of 1,1-di(t-butyl peroxy)cyclohexane made of NOF Corporation and silica, and is used as a crosslinking initiator.
Percumyl D is dicumyl peroxide made of NOF Corporation.
Zinc oxide is zinc oxide #3 (trade name) made of Sakai Chemical Industry Co., Ltd.
Antioxidant is 2,2'-methylenebis(4-methyl-6-t-butylphenol), and is Nocrac NS-6 ™ made of Ouchi Shinko Chemical Industry Co., Ltd.
Zinc acrylate is WN86 made of Nippon Shokubai Co., Ltd.

TABLE 4

|  | G | h |
| --- | --- | --- |
| HIMILAN 1605 | — | 40 |
| HIMILAN 1706 | — | 50 |
| HIMILAN 1601 | — | 10 |
| HIMILAN 1557 | 75 | — |
| HIMILAN 1855 | 25 | — |

HIMILAN 1605 ™, HIMILAN 1706 ™, HIMILAN 1601 ™, HIMILAN 1557 ™, and HIMILAN 1855 ™ are ionomer resins made of DuPont-Mitsui Polychemicals Co., Ltd.

The resilience in Table 1 is evaluated by measuring an initial velocity of the golf balls by using the initial velocity measuring instrument which is the same system as the drum rotary initial velocity meter of United States Golf Association (USGA) which is the device approved by Royal and Ancient Golf Club of Saint Andrews (R&A). The temperature of the sample golf balls is adjusted for more than 3 hours under the environment of 23±1° C., and the sample golf balls are tested in the room at the room temperature of 23±2° C. By striking each of the 11 sample balls twice, the flight time for the distance of 6.28 ft (1.91 m) is measured, and the initial velocity is measured. In the evaluations, ⊙ is equal to or more than 77 m/s; ○ is equal to or more than 76 m/s; and x is less than 76 m/s.

In the durability in Table 1, the durability of the RFID tag inside the golf balls is evaluated by using the ADC Ball COR (Coefficient of Restitution) Durability Tester machine made of US Automated Design Corporation. This test machine has a function to sequentially shoot the golf balls to two metal plates provided in parallel after striking golf balls by air pressure. The incident velocity to the metal plates is 43 m/s. An average value of the number of striking times in which it becomes impossible to read the RFID tag inside the golf balls is calculated. In this case, the average value means a value averaging the number of striking times in which it becomes impossible to read for each of 5 sample balls prepared and struck. In the evaluations, ⊙ is equal to or more than 60 times; ○ is equal to or more than 20 times; and x is less than 60 times.

The readability in Table 1 is evaluated by measuring the readable distance by approximating the RFID reader to the golfballs. In the evaluations, ⊙ is equal to or more than 2 cm; a is equal to or more than 1 millimeters; and x is impossible to read.

As indicated by the evaluation of the durability in Table 1, the golf balls in Examples 1 to 6 in which the protective layer was formed by the material having Shore D hardness equal to or more than 30 could suppress the deformation of the golf balls after the balls were struck. Therefore, the sufficient readability of the RFID tag is maintained after the balls are struck. Specifically, in Examples 3 and 4, the Shore D hardness is equal to or more than 60, and the hardness of the core is softer than the hardness of the protective layer. Further, the difference $H_D$ is as small as 10, and therefore the durability is particularly high.

On the other hand, in Comparison Examples 7 and 8 in which the protective layer was formed by the material having Shore D hardness less than 30, the protective layer is deformed when the golf balls are struck, and the RFID tag is damaged. Therefore, sufficient durability cannot be maintained.

In Comparison Examples 9 to 11, the protective layer is formed by the material having Shore D hardness equal to or more than 30. In Comparison Example 9, the diameter of the protective layer is very small as 2.5 millimeters, and, therefore, the RFID tag has a 1 millimeters in diameter. Accordingly, the antenna is small and the readability is very poor. Further, in Comparison Examples 10 and 11, in which the diameter of the protective layer is large to be as equal to or more than 30 millimeters, the dimension of the RFID tag having the size of 29 millimeters and 32 millimeters is employed. Therefore, the antenna can be widely stretched, and the readability is good. However, the area of the core is not sufficiently secured, and therefore the resilience is very poor.

DESCRIPTION OF REFERENCE CHARACTERS

The entire disclosure of Japanese Patent Application No. 2012-043369 filed on Feb. 19, 2012, which describes certain features related to the present disclosure, is incorporated herein by reference in its entirety.

The terms and descriptions used herein are used only for explanatory purposes and the present invention is not limited to them. Accordingly, the present invention allows various design-changes falling within the claimed scope of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, the terminology "present invention" or "invention" is meant as a non-specific, general reference and may be used as a reference to one or more aspects within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features.

What is claimed is:

1. A golf ball, comprising:
   an IC chip;
   a protective layer surrounding an outer periphery of the IC chip, the protective layer being made of resin;
   a core surrounding an outer periphery of the protective layer; and
   a cover surrounding an outer periphery of the core,
   wherein the protective layer is formed by a material having a hardness equal to or more than 30 in Shore D,
   wherein a difference between a hardness of the core and the hardness of the protective layer is equal to or less than 20, and
   wherein a diameter of the protective layer is 3 to 30 millimeters, and an outer shape of the protective layer has an approximately spherical shape.

2. The golf ball according to claim 1, further comprising a radio-frequency identification (RFID) tag with an antenna connected to the IC chip, and the protective layer surrounds an outer periphery of the RFID tag.

3. The golf ball according to claim 1, wherein a hardness of the core is less than the hardness of the protective layer.

4. The golf ball according to claim 1, wherein a material of the core includes a rubber.

5. The golf ball according to claim 1, further comprising an antenna electronically connected to the IC chip, wherein the antenna encircles the IC chip.

6. The golf ball according to claim 5, wherein the antenna and the IC chip comprise an RFID tag.

7. A golf ball configured to transmit or receive information by a wireless communication, the golf ball comprising:
   a radio-frequency identification (RFID) tag having an integrated circuit (IC) chip and an antenna;
   a protective layer surrounding the RFID tag and formed by a material having a hardness equal to or more than 30 in Shore D, the protective layer being made of resin;
   a core surrounding the protective layer, wherein the core has a hardness less than the hardness of the protective layer; wherein a difference between the hardness of the protective layer and the hardness of the core is about 20 Shore D, and
   a cover enclosing the core,
   wherein a diameter of the protective layer is greater than a diameter of the antenna.

8. The golf ball according to claim 7, wherein the diameter of the protective layer is between 3 to 30 millimeters.

9. The golf ball according to claim 7 wherein the hardness of the core is equal to or less than 60 in Shore D.

10. The golf ball according to claim 7, wherein the material of the protective layer has a melting point equal to or less than 230 degrees Celsius.

11. The golf ball according to claim 7, wherein the material of the protective layer has a melting point equal to or greater than 80 degrees Celsius.

* * * * *